(12) United States Patent
Ashraf (10) Patent No.: US 12,528,387 B2
(45) Date of Patent: Jan. 20, 2026

(54) CONTROL OF BATTERY SYSTEM TEMPERATURE FOR HIGH PERFORMANCE

(71) Applicant: GM Global Technology Operations LLC, Detroit, MI (US)

(72) Inventor: Omar Ashraf, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 209 days.

(21) Appl. No.: 18/465,337

(22) Filed: Sep. 12, 2023

(65) Prior Publication Data

US 2025/0083570 A1    Mar. 13, 2025

(51) Int. Cl.
*B60L 58/27* (2019.01)
*B60L 15/20* (2006.01)

(52) U.S. Cl.
CPC .......... *B60L 58/27* (2019.02); *B60L 15/2045* (2013.01); *B60L 2240/545* (2013.01); *B60L 2240/662* (2013.01); *B60L 2250/16* (2013.01)

(58) Field of Classification Search
None
See application file for complete search history.

(56) References Cited

U.S. PATENT DOCUMENTS

| | | | |
|---|---|---|---|
| 7,741,816 B2* | 6/2010 | Kelty | H01M 10/6567 429/62 |
| 11,114,711 B2* | 9/2021 | Xiong | B60L 3/12 |
| 11,223,073 B2* | 1/2022 | Zhang | H01M 10/625 |
| 11,325,501 B2* | 5/2022 | Robert | H02J 7/02 |
| 2011/0307130 A1* | 12/2011 | Gow | B60L 3/102 701/22 |
| 2020/0280110 A1 | 9/2020 | Zhang et al. | |

OTHER PUBLICATIONS

German Office Action for German Application No. 102023130661.8; dated Jul. 2, 2025; 6 pages.

* cited by examiner

*Primary Examiner* — Todd Melton
(74) *Attorney, Agent, or Firm* — CANTOR COLBURN LLP (57) ABSTRACT

A system for thermal control of a battery system of a vehicle includes a heating control module configured to control a temperature of the battery system. The heating control module is configured to receive a request to put the vehicle into a high performance mode, and based on the request, determine the temperature of the battery system and put the vehicle into the high performance mode. The heating control module is also configured to determine a target battery temperature based on an environmental condition around the vehicle, and during operation of the vehicle in the high performance mode, automatically control the temperature of the battery system to maintain the temperature of the battery system proximate to the target battery temperature to optimize performance of the vehicle.

20 Claims, 4 Drawing Sheets

FIG. 1

| $T_A$ | -40 | 0 | 5 | 10 | 15 | 20 | 25 | 30 | 35 | 40 |
|---|---|---|---|---|---|---|---|---|---|---|
| $T_T$ | 50 | 50 | 50 | 50 | 47 | 45 | 43 | 41 | 38 | 35 |
| $T_{Ttrack1}$ | # | # | # | # | # | # | # | # | # | # |
| $T_{Ttrack2}$ | # | # | # | # | # | # | # | # | # | # |
| ... | | | | | | | | | | |
| $T_{Ttrackn}$ | # | # | # | # | # | # | # | # | # | # |

FIG. 2

| AS | 0 | 1 | 2 | 3 | 4 | 5 | 6 | 7 | 8 | 9 |
|---|---|---|---|---|---|---|---|---|---|---|
| $\Delta T$ | -5 | -4 | -3 | -2 | -1 | 0 | 1 | 2 | 3 | 4 |

CONTROL OF BATTERY SYSTEM TEMPERATURE FOR HIGH PERFORMANCE

INTRODUCTION

The subject disclosure relates to thermal control of batteries, and more specifically, to optimizing battery temperature based on vehicle mode.

Vehicles, including gasoline and diesel power vehicles, as well as electric and hybrid electric vehicles, feature battery storage for purposes such as powering electric motors, electronics and other vehicle subsystems. Many battery systems and electric vehicles feature thermal control systems for heating battery modules to maintain proper operating temperatures.

SUMMARY

In one exemplary embodiment, a system for thermal control of a battery system of a vehicle includes a heating control module configured to control a temperature of the battery system. The heating control module is configured to receive a request to put the vehicle into a high performance mode, and based on the request, determine the temperature of the battery system and put the vehicle into the high performance mode. The heating control module is also configured to determine a target battery temperature based on an environmental condition around the vehicle, and during operation of the vehicle in the high performance mode, automatically control the temperature of the battery system to maintain the temperature of the battery system proximate to the target battery temperature to optimize performance of the vehicle.

In addition to one or more of the features described herein, the environmental condition includes at least one of an ambient temperature and a location of the vehicle.

In addition to one or more of the features described herein, the target battery temperature is determined based on a stored data structure that relates target battery temperature values to ambient temperature values.

In addition to one or more of the features described herein, the system includes a user interface configured to present temperature information to a user, and configured to allow the user to manually adjust the target battery temperature.

In addition to one or more of the features described herein, the target battery temperature is related to a maximum battery temperature associated with the environmental condition.

In addition to one or more of the features described herein, the maximum battery temperature is a derating temperature associated with the environmental condition, and the target battery temperature is a temperature value within a selected range of the derating temperature, the selected range based on at least one of the environmental condition and a user input.

In addition to one or more of the features described herein, the heating control module is configured to control the temperature of the battery system by at least one of controlling a temperature control device in the vehicle, and controlling a heating current applied to the battery system.

In addition to one or more of the features described herein, the heating control module is configured to prompt a user to provide an assessment of vehicle performance during the high performance mode, and adjust the target battery temperature based on the assessment.

In another exemplary embodiment, a method of thermally controlling a battery system of a vehicle includes receiving a request to put the vehicle into a high performance mode, and based on the request, determining a temperature of the battery system and putting the vehicle into the high performance mode. The method also includes determining a target battery temperature based on an environmental condition around the vehicle, and during operation of the vehicle in the high performance mode, automatically controlling the temperature of the battery system to maintain the temperature of the battery system proximate to the target battery temperature to optimize performance of the vehicle.

In addition to one or more of the features described herein, the environmental condition includes at least one of an ambient temperature and a location of the vehicle.

In addition to one or more of the features described herein, the target battery temperature is determined based on a stored data structure that relates target battery temperature values to ambient temperature values.

In addition to one or more of the features described herein, the method includes presenting temperature information to a user via a user interface, the user interface configured to allow the user to manually adjust the target battery temperature.

In addition to one or more of the features described herein, the target battery temperature is related to a maximum battery temperature associated with the environmental condition.

In addition to one or more of the features described herein, the maximum battery temperature is a derating temperature associated with the environmental condition, and the target battery temperature is a temperature value within a selected range of the derating temperature, the selected range based on at least one of the environmental condition and a user input.

In addition to one or more of the features described herein, controlling the temperature of the battery system includes at least one of controlling a temperature control device in the vehicle, and controlling a heating current applied to the battery system.

In addition to one or more of the features described herein, the method includes prompting a user to provide an assessment of vehicle performance during the high performance mode, and adjusting the target battery temperature based on the assessment.

In yet another exemplary embodiment, a vehicle system includes a memory having computer readable instructions, and a processing device for executing the computer readable instructions, the computer readable instructions controlling the processing device to perform a method. The method includes receiving a request to put a vehicle into a high performance mode, and based on the request, determining a temperature of a battery system of the vehicle and putting the vehicle into the high performance mode. The method also includes determining a target battery temperature based on an environmental condition around the vehicle, and during operation of the vehicle in the high performance mode, automatically controlling the temperature of the battery system to maintain the temperature of the battery system proximate to the target battery temperature to optimize performance of the vehicle.

In addition to one or more of the features described herein, the method includes presenting temperature information to a user via a user interface, the user interface configured to allow the user to manually adjust the target battery temperature.

In addition to one or more of the features described herein, the target battery temperature is related to a maximum battery temperature associated with the environmental condition.

In addition to one or more of the features described herein, the maximum battery temperature is a derating temperature associated with the environmental condition, and the target battery temperature is a temperature value within a selected range of the derating temperature, the selected range based on at least one of the environmental condition and a user input.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for thermal control of battery systems, such as vehicle battery systems. An embodiment of a battery temperature control system is configured to put a vehicle into an operating mode in which a control device continuously or periodically adjusts a temperature of a battery system to maintain the temperature at an optimal level that is conducive to high performance of the vehicle.

For example, a user or system can generate a request to enter a high performance mode (e.g., when the vehicle is operated on a race track). Based on the request, the control device acquires temperature measurements of the vehicle's battery pack(s), as well as ambient temperature information. From this information, a target temperature value is determined. The target temperature may correspond to a maximum temperature (e.g., be equal to the maximum temperature or within a selected range of the maximum temperature). For example, the target temperature can be set in relation to a derating temperature (i.e., a temperature set at which power is reduced to avoid overheating the battery pack). During vehicle operation in the high performance mode, the control device maintains the battery temperature at or near the target temperature.

Embodiments described herein present numerous advantages and technical effects. The embodiments provide for additional power, which can be quickly applied based on user request. The embodiments maximize performance while avoiding derating or damage to a battery system.

The temperature control system can auto-calibrate and customize temperature targets for specific driving and environmental conditions. For example, for racing applications, the embodiments provide the ability to control temperature after an initial lap to decrease lap times, and the embodiments allow users to decrease lap times or otherwise increase performance in low temperature conditions.

The embodiments are not limited to use with any specific vehicle and may be applicable to various contexts. For example, embodiments may be used with automobiles, trucks, aircraft, construction equipment, farm equipment, automated factory equipment and/or any other device or system for which additional thermal control may be desired to facilitate a device or system's existing thermal control capabilities or features.

Figure 1:
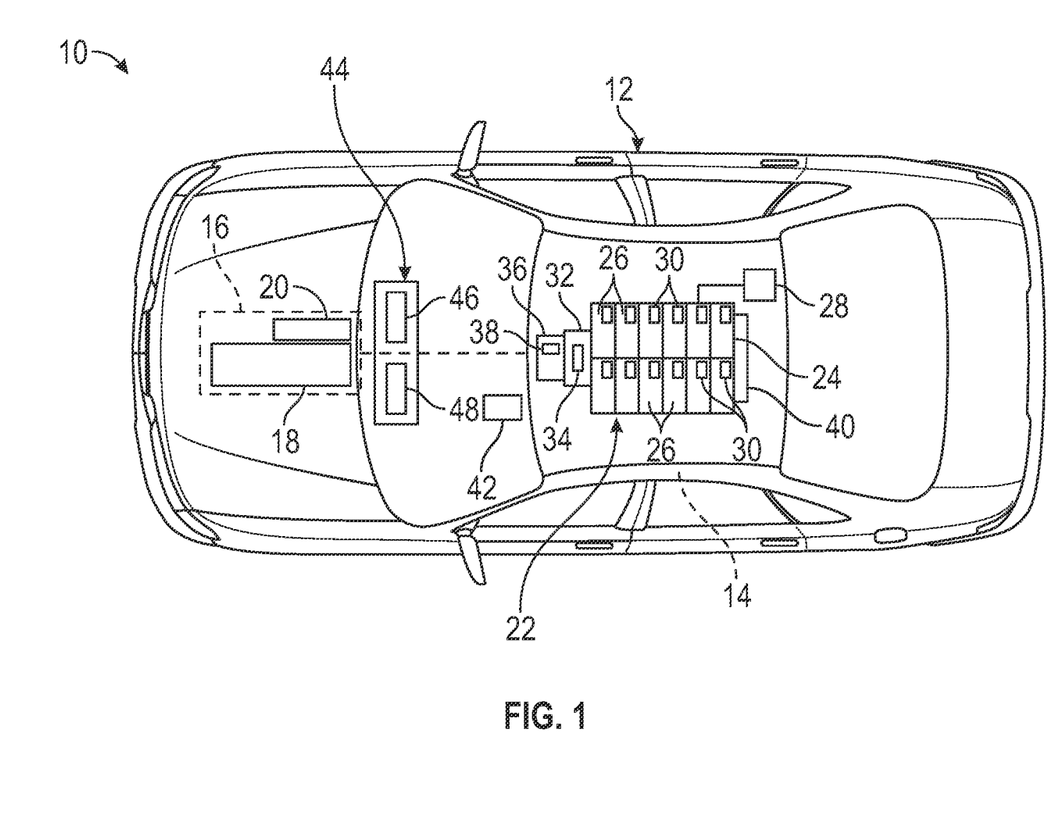
FIG. 1 is a top view of a motor vehicle including a battery assembly or system and a battery temperature control system, in accordance with an exemplary embodiment.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle may be a combustion engine vehicle, an electrically powered vehicle (EV) or a hybrid electric vehicle (HEV). In an example, the vehicle 10 is a hybrid vehicle that includes a combustion engine 18 and an electric motor 20.

The vehicle 10 includes a battery system 22, which may be electrically connected to the motor 20 and/or other components, such as vehicle electronics. In an embodiment, the battery system 22 includes a battery assembly such as a high voltage battery pack 24 having a plurality of battery modules 26. Each of the battery modules 26 includes a number of individual cells (not shown). The battery system 22 may also include a monitoring unit 28 configured to receive measurements from sensors 30. Each sensor 30 may be an assembly or system having one or more sensors for measuring various battery and environmental parameters, such as temperature, current and voltages. The monitoring unit 28 includes components such as a processor, memory, an interface, a bus and/or other suitable components.

The battery system 22 includes various conversion devices for controlling the supply of power from the battery pack 24 to the motor 20 and/or electronic components. The conversion devices include a DC-DC converter module 32 for adjusting direct current (DC). The DC-DC converter module 32 is electrically connected to the battery system 22 and includes a DC-DC converter circuit 34 (referred to herein as a DC-DC converter 34).

The conversion devices also include an inverter module 36 that includes an inverter circuit 38 (referred to herein as an inverter 38). The inverter 38 receives DC power from the DC-DC converter 34 and converts direct current (DC) power to alternating current (AC) power that is supplied to the electric motor 20. The inverter 38 includes one or more sets of switches or switching devices (e.g., controllable semiconductor switches such as metal-oxide-semiconductor field-effect transistors (MOSFETs)) that are controllable to supply AC power to each phase of the motor 20.

The vehicle 10 includes a battery temperature control system, which includes various components and systems for controlling or regulating the temperature of the battery system 22 and/or other parts of the vehicle (e.g., the vehicle compartment 14). For example, the battery system 22 includes a thermal control device 40, such as a heat pump or a resistive heater.

In an embodiment, components of the vehicle 10 form all or part of an alternating current (AC) heating system for controlling a temperature of the battery system 22. The system is configured to generate an AC signal (also referred to as an "AC current," a "heating current" or an "AC heating current") and apply the AC heating current to the battery pack 24. The heating system may be used to heat the battery pack 24 during vehicle motion, when the vehicle 10 is operating and at a stand-still, and/or during charging of the vehicle 10.

In an embodiment, the heating system is configured to use energy generated by the battery pack 24 and an electric motor and/or charging station (or other energy source) to apply an AC heating current to the battery pack 24 by controlling a conversion device (e.g., the inverter 38 and/or the DC-DC converter 34).

The battery temperature control system includes a control module 42 configured to control heating and/or cooling, for example, by controlling the thermal control device 40 and/or the AC heating system. The control module 42 is configured to monitor battery parameters (e.g., temperature, voltage, current and impedance), or measure temperature and/or other parameters in response to a request by a user (e.g., driver) or a request from another system.

The control module 42 and/or other processing device or devices are configured to put the vehicle 10 into an operating mode, in which the temperature of the battery system is maximized or optimized for high performance applications. Examples of high performance applications include racing, vehicle testing and other situations or conditions in which it is desirable for the vehicle to receive additional power (as compared to normal operating conditions). The operating mode is referred to as a "high performance mode."

When the vehicle 10 is in the high performance mode, the control module 42 determines an optimal battery temperature based on the current condition (e.g., current temperature) of the battery system 22, and based on environmental conditions such as ambient temperature, weather conditions (e.g., sunny, cloudy, etc.), season and geographic location. The optimal battery temperature (also referred to as a "target temperature") may be a maximum allowable temperature (e.g., a derating temperature) or a temperature value related to a maximum allowable temperature. The control module 42 maintains the battery temperature during operation to be proximate to the optimal or target temperature. A temperature value is "proximate" to a target temperature when the temperature value is equal to the target temperature, as close as possible to the target temperature, or within a range or tolerance.

The battery temperature control system maximizes the battery temperature to increase performance, as internal resistances of a cell are a function of temperature, and a hotter cells have a lower resistance and therefore can output more current for a given voltage. At the same time, the temperature control system limits battery temperature to avoid derating or other negative effects. In this way, the desire for high performance is balanced by the need to protect a battery system from excessive temperatures.

The control module 42 may be a dedicated controller as shown, or disposed elsewhere. The control module 42 may be an existing controller, such as the monitoring unit 28 or a computer system 44. The control module 42 can also be realized using a combination of processors or controllers.

The computer system 44 includes one or more processing devices 46 and a user interface 48. The various processing devices and units may communicate with one another via a communication device or system, such as a controller area network (CAN) or transmission control protocol (TCP) bus.

The user interface 48 may be used to facilitate temperature control as described herein. For example, the user interface presents relevant information to a user (e.g., driver), such as the current battery system temperature and a target temperature. The user interface may dynamically update the information to allow the user to monitor performance continuously or periodically during driving. In addition, the user interface is able to receive inputs from a user, such as manual adjustments to the target temperature.

As discussed further herein, when the vehicle 10 is in a high performance mode, the control module 42 heats or cools the battery system 22 as appropriate to maintain the temperature at or near the target temperature (e.g., a derating temperature), or within a selected range of the target temperature. The selected range may be determined based on battery parameters (e.g., voltage and temperature ratings, manufacturer recommendations, etc.) and/or based on user input. For example, a user can manually set the range, or allow the control module 42 to automatically select the range.

The control module 42 and/or other processor(s) is/are configured to perform aspects of a method of battery system temperature control. The method generally includes receiving a request to enter a high performance mode, determining environmental conditions (e.g., ambient temperature), and determining a target temperature based on the environmental conditions and/or user input. The method further includes controlling the temperature of the battery system 22 to maintain the temperature as close as possible to the target temperature.

In an embodiment, the target temperature is determined based on a data structure such as a look-up table (LUT). The data structure relates environmental conditions such as ambient temperature and/or location to target temperature values. It is noted that the data structure may be updated as desired after each instance of the vehicle 10 operating in the high performance mode.

Figure 2:
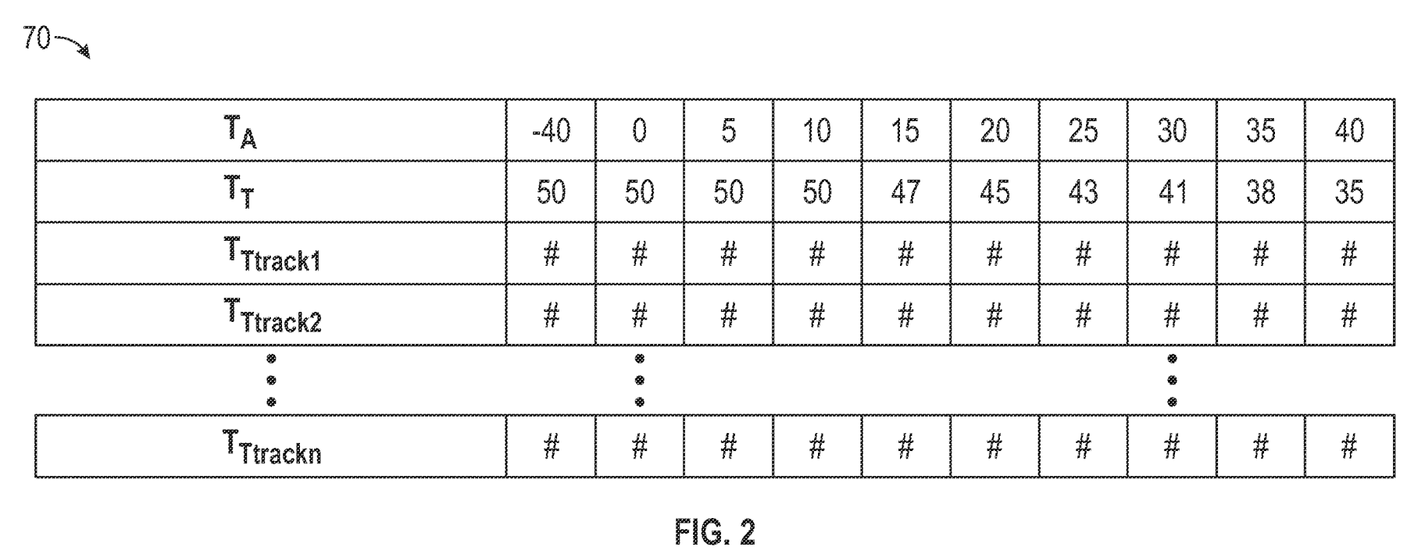
FIG. 2 depicts an example of a look-up table (LUT) that may be used as part of a method of controlling a battery system temperature.

FIG. 2 depicts an example of a LUT 70 that relates target temperature values to ambient temperature values. In the LUT 70, the ambient temperature values (in Celsius) are labelled as "TA" and stored in a first row, and corresponding target temperature values are labelled as "Tr" and stored in a second row.

In an embodiment, the target temperatures can be based on local conditions in addition to the ambient temperature. Accordingly, "environmental conditions" may include ambient temperature in combination with location information (and any other desired information regarding conditions around the vehicle that may affect battery system temperature). Local conditions may be determined based on a location of the vehicle 10, which may be determined via, for example, global positioning system (GPS) information. Examples of local conditions include road type, elevation, road grade, curvature and others.

For example, the target temperature may be based on the ambient temperature in combination with location information, such as a specific track or other facility or roadway that the vehicle 10 is located at. FIG. 2 depicts an example of target temperatures based on a number n of specific tracks (i.e., track1, track2 trackn). In this example, the row labelled as $T_T$ provides target temperatures that are not dependent on location. For each track, a set of target temperatures is included in the LUT 70 and labelled as "$T_{Ttrackn}$". As shown, a row is provided for a first track ("track1") and is denoted as "$T_{Ttrack1}$", and a row is provided for a second track ("track2") and is denoted as "$T_{Ttruck2}$". In this way, target temperatures can be customized based on, for example, data collected during previous runs at a given track.

Figure 3:
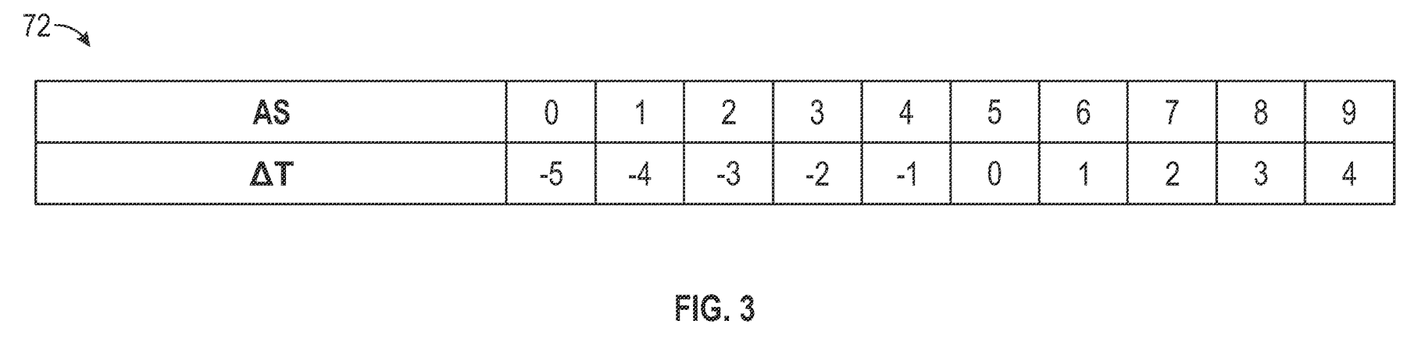
FIG. 3 depicts an example of a LUT that may be used as part of a method of controlling a battery system temperature.

A user may manually enter target temperature values, or provide adjustments to target temperature values. FIG. 3 depicts an example of a LUT 72 used for adjusting a target temperature based on user input. In this example, the LUT 72 relates driver temperature adjustment settings to corresponding adjustments to the target temperature. The user may input a temperature adjustment setting ("AS"), which prompts the control module to adjust the target temperature by a temperature value "ΔT". For example, if the user enters a setting value of 1, the target temperature (e.g., temperature determined from the LUT 70) is reduced by 4 degrees C.

Figure 4:
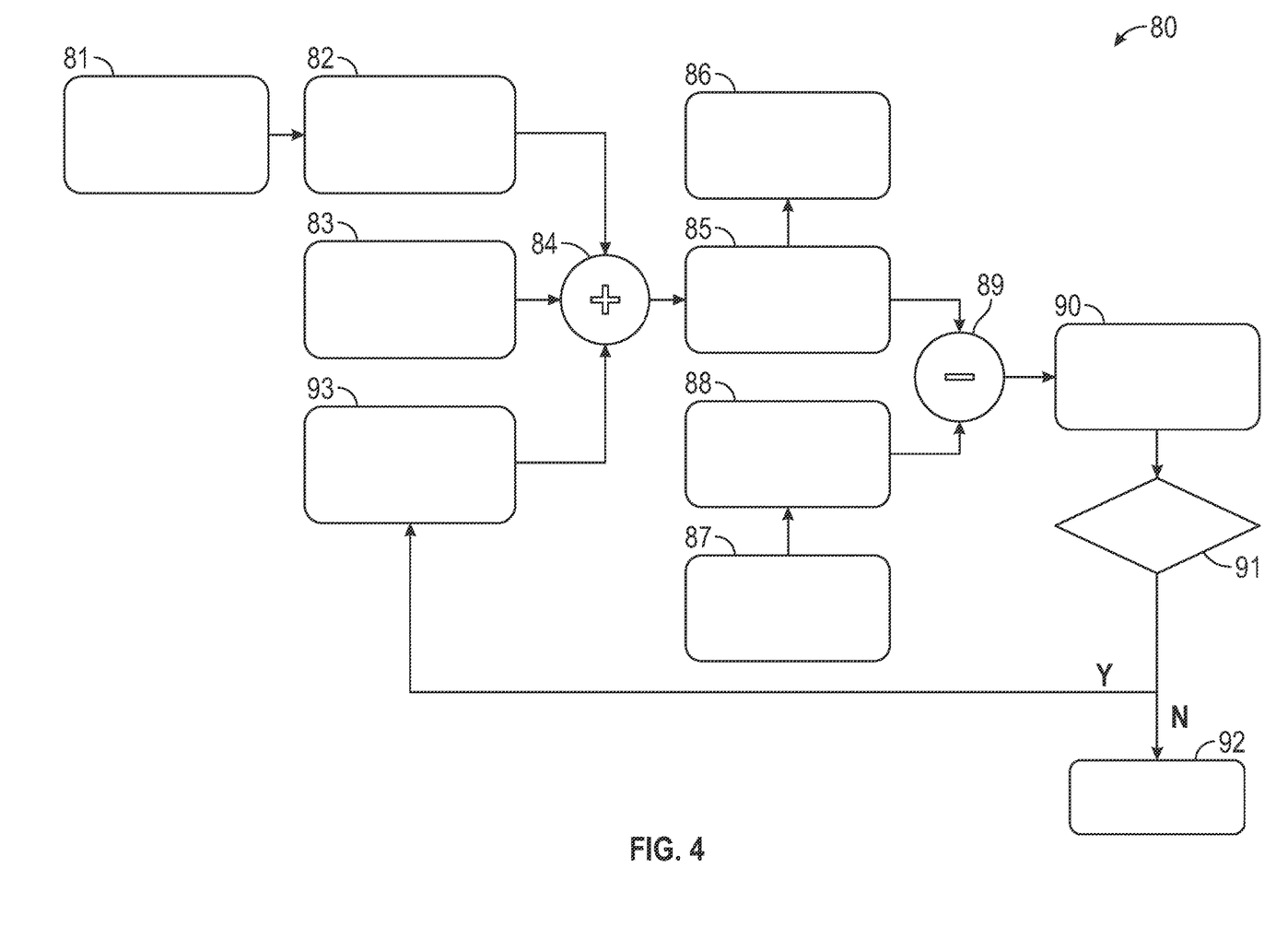
FIG. 4 is a flow diagram depicting aspects of a method of controlling a temperature of a battery system, in accordance with an exemplary embodiment.

FIG. 4 illustrates embodiments of a method 80 of controlling the temperature of a battery system of a vehicle. Aspects of the method 80 may be performed by the control module 40 or other suitable processing device.

The method 80 is described in conjunction with the vehicle 10 and components thereof, but is not so limited, as the method 80 may be performed in conjunction with any suitable vehicle or battery assembly, and with any suitable device or system that utilizes battery storage.

In addition, the method 80 is described in the context of a racing vehicle or passenger vehicle being operated on a race track. The method 80 is performed to account for ambient air conditions and determine the optimal target temperature that will provide the fastest lap, thereby balancing performance with avoidance of derating due to temperature. In this context, the high performance mode is referred to as a "hot lap mode."

The method 80 is not so limited, and can be performed in conjunction with any suitable vehicle in any situation where higher performance or higher power is desired.

The method 80 includes a number of steps or stages represented by blocks 81-93. The method 80 is not limited to the number or order of steps therein, as some steps represented by blocks 81-93 may be performed in a different order than that described below, or fewer than all of the steps may be performed.

The method 80 is initiated in response to a request to put the vehicle 10 in the hot lap mode or other high performance mode. The request may be received from another vehicle system or a remote system. In an embodiment, the request is received via an input from the user via the user interface 48 or other suitable interface (e.g., touchscreen of a mobile device or remote processor). The request may in the form of a triggering signal prompted by vehicle conditions, such as speed, power requested (e.g., by the user accelerating the vehicle) and others.

The user may enter any desired manual adjustments. For example, the user may enter a temperature adjustment setting. Examples of temperature adjustment setting values are shown in FIG. 3. The value of the temperature adjustment setting is used by the control module 42 to adjust the target temperature as discussed further herein.

At block 81, the control module 42 acquires information regarding the condition of the vehicle 10 and/or surrounding environment. For example, the control module 42 acquires temperature measurements indicative of a current temperature of the battery system 22 and the ambient air temperature around the vehicle 10.

At block 82, the ambient air temperature is used to determine the target temperature. For example, the control module 42 inspects the LUT 70 and determines a target temperature. The target temperature may be based on other factors, such as location (e.g., a specific race track).

At block 83, if the user entered any manual adjustments, such adjustments are applied to the target temperature. For example, if the control module 42 identifies a temperature adjustment setting entered by the user, the LUT 72 is accessed to determine a temperature adjustment value.

At block 84, if applicable, the target temperature is input to a comparator, or otherwise applies adjustments to the target temperature as needed. For example, if a temperature adjustment value is determined, the target temperature is increased or decreased accordingly. If any automatic adjustments are determined (See block 93), such adjustments are also applied to adjust the target temperature.

At block 85, the target temperature is output from the comparator. The target temperature may be provided to a battery temperature control system (e.g., the thermal control device 40) for control of the battery system temperature at block 86.

The target temperature is then used during the lap to control battery system temperature by heating or cooling the battery system 22, so that the battery system temperature is at (or as close as possible to) the target temperature. The battery system temperature can be controlled by operating a temperature control device (e.g., the temperature control device 40), applying AC heating current, using an engine coolant bypass loop and/or using a vehicle air conditioning system.

At block 87, the battery system temperature is monitored as the vehicle 10 is operated. For example, the battery system temperature is measured continuously or periodically as the vehicle 10 completes a lap (e.g., via the sensors 30 of FIG. 1). At block 88, the control module 42 receives temperature measurements and calculates a maximum measured temperature for the lap (or receives the maximum measured temperature from another processor or system).

At block 89, the target temperature is compared to the maximum measured temperature, and a difference therebetween (i.e., a delta) is calculated. The delta is output at block 90.

The user interface 48 or other interface is used to request input from the user as to whether the lap was satisfactory (e.g., there were no accidents or significant driver error). At block 91, the processing device receives the user input and determines whether the lap was satisfactory. If not, the delta is discarded (block 92).

At block 93, if the user responds affirmatively that the lap was satisfactory, the delta is used by the control module to make an automatic adjustment (i.e., increase or decrease) to the target temperature based on the delta. In future iterations (e.g., subsequent laps), the target temperature will be adjusted according to the automatic adjustment.

At this point, the user can drive additional laps, and blocks 81-93 are repeated for each lap as desired. The target temperature may be stored and related to a specific lap and/or location, so that target temperatures can be used in the future without re-learning.

Figure 5:
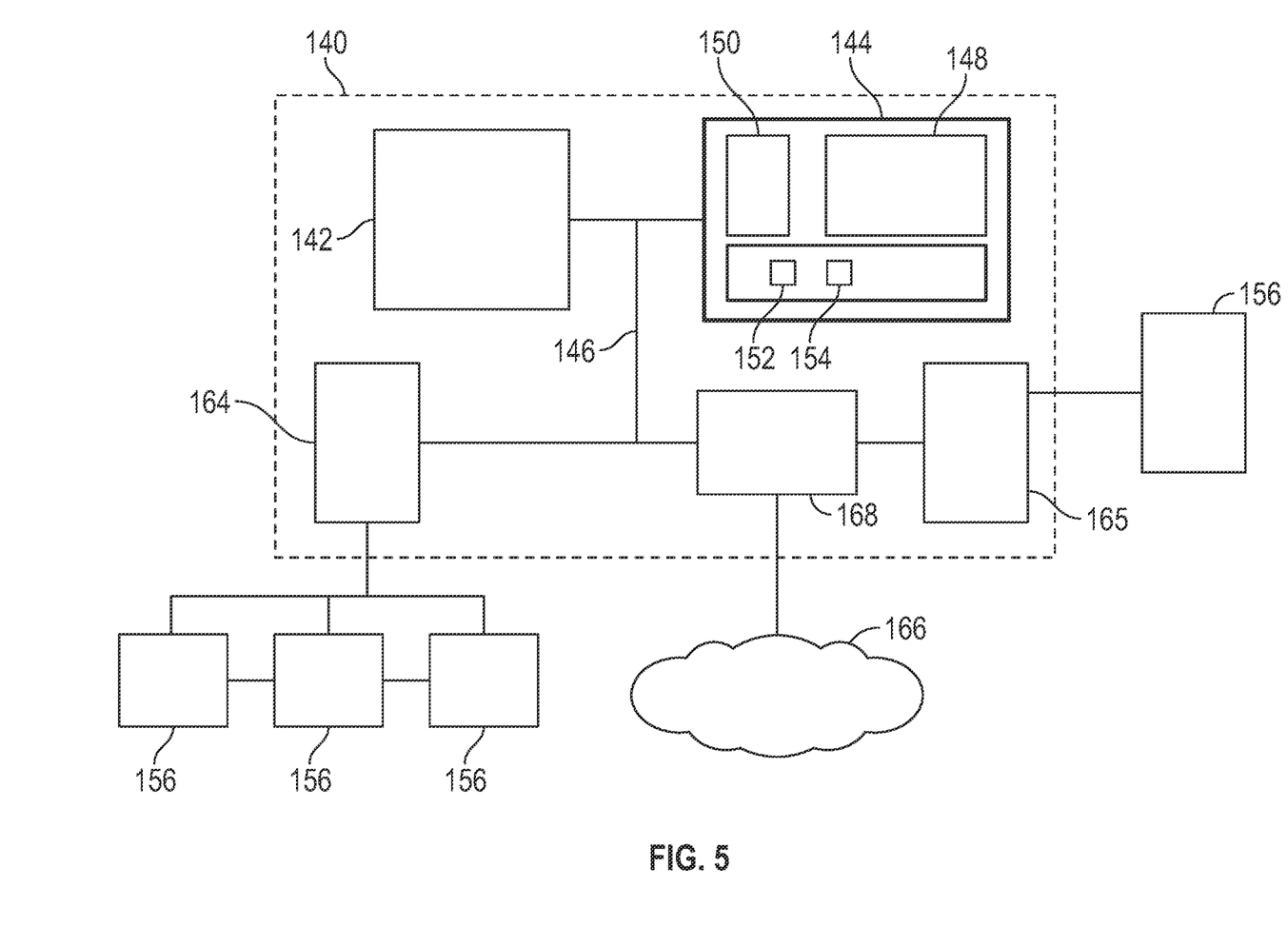
FIG. 5 depicts a computer system in accordance with an exemplary embodiment.

FIG. 5 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a battery system, and a module 154 may be included to perform functions related to battery temperature control as described herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for thermal control of a battery system of a vehicle, comprising:
   a heating control module configured to control a temperature of the battery system, the heating control module configured to:
   receive a request to put the vehicle into a high performance mode;
   based on the request, determine a temperature of the battery system and put the vehicle into the high performance mode;
   determine a target battery temperature based on an environmental condition around the vehicle;
   receive a temperature adjustment value based on an input from a user of the vehicle;
   during operation of the vehicle in the high performance mode during a first time period, automatically control the temperature of the battery system to maintain the temperature of the battery system proximate to the target battery temperature to optimize performance of the vehicle;
   query the user as to whether the operation of the vehicle during the first time period was satisfactory; and
   based on the user indicating that the operation was satisfactory, automatically adjust the target battery temperature based on the temperature adjustment value for at least one subsequent time period.

2. The system of claim 1, wherein the environmental condition includes at least one of an ambient temperature and a location of the vehicle.

3. The system of claim 2, wherein the target battery temperature is determined based on a stored data structure that relates target battery temperature values to ambient temperature values.

4. The system of claim 1, further comprising a user interface configured to present temperature information to a user, and configured to allow the user to manually adjust the target battery temperature.

5. The system of claim 1, wherein the target battery temperature is related to a maximum battery temperature associated with the environmental condition.

6. The system of claim 5, wherein the maximum battery temperature is a derating temperature associated with the environmental condition, and the target battery temperature is a temperature value within a selected range of the derating temperature, the selected range based on at least one of the environmental condition and a user input.

7. The system of claim 1, wherein the heating control module is configured to control the temperature of the battery system by at least one of controlling a temperature control device in the vehicle, and controlling a heating current applied to the battery system.

8. The system of claim 1, wherein the heating control module is configured to adjust the target battery temperature based on a look-up table, the look-up table configured to relate the temperature adjustment value to a pre-selected change in the target battery temperature.

9. A method of thermally controlling a battery system of a vehicle, comprising:
   receiving a request to put the vehicle into a high performance mode;
   based on the request, determining a temperature of the battery system and putting the vehicle into the high performance mode;
   determining a target battery temperature based on an environmental condition around the vehicle;
   receiving a temperature adjustment value based on an input from a user of the vehicle;
   during operation of the vehicle in the high performance mode during a first time period, automatically controlling the temperature of the battery system to maintain the temperature of the battery system proximate to the target battery temperature to optimize performance of the vehicle;
   querying the user as to whether the operation of the vehicle during the first time period was satisfactory; and
   based on the user indicating that the operation was satisfactory, automatically adjusting the target battery temperature based on the temperature adjustment value for at least one subsequent time period.

10. The method of claim 9, wherein the environmental condition includes at least one of an ambient temperature and a location of the vehicle.

11. The method of claim 10, wherein the target battery temperature is determined based on a stored data structure that relates target battery temperature values to ambient temperature values.

12. The method of claim 9, further comprising presenting temperature information to a user via a user interface, the user interface configured to allow the user to manually adjust the target battery temperature.

13. The method of claim 9, wherein the target battery temperature is related to a maximum battery temperature associated with the environmental condition.

14. The method of claim 13, wherein the maximum battery temperature is a derating temperature associated with the environmental condition, and the target battery temperature is a temperature value within a selected range of the derating temperature, the selected range based on at least one of the environmental condition and a user input.

15. The method of claim 9, wherein controlling the temperature of the battery system includes at least one of: controlling a temperature control device in the vehicle, and controlling a heating current applied to the battery system.

16. The method of claim 9, wherein adjusting the target battery temperature is based on a look-up table, the look-up table configured to relate the temperature adjustment value to a pre-selected change in the target battery temperature.

17. A vehicle system comprising:
    a memory having computer readable instructions; and
    a processing device for executing the computer readable instructions, the computer readable instructions controlling the processing device to perform a method including:
    receiving a request to put a vehicle into a high performance mode;
    based on the request, determining a temperature of a battery system of the vehicle and putting the vehicle into the high performance mode;
    determining a target battery temperature based on an environmental condition around the vehicle;
    receive a temperature adjustment value based on an input from a user of the vehicle;
    during operation of the vehicle in the high performance mode during a first time period, automatically controlling the temperature of the battery system to maintain the temperature of the battery system proximate to the target battery temperature to optimize performance of the vehicle;
    querying the user as to whether the operation of the vehicle during the first time period was satisfactory; and
    based on the user indicating that the operation was satisfactory, automatically adjusting the target battery temperature based on the temperature adjustment value for at least one subsequent time period.

18. The vehicle system of claim 17, wherein the method includes presenting temperature information to a user via a user interface, the user interface configured to allow the user to manually adjust the target battery temperature.

19. The vehicle system of claim 17, wherein the target battery temperature is related to a maximum battery temperature associated with the environmental condition.

20. The vehicle system of claim 19, wherein the maximum battery temperature is a derating temperature associated with the environmental condition, and the target battery temperature is a temperature value within a selected range of the derating temperature, the selected range based on at least one of the environmental condition and a user input.

* * * * *